United States Patent [19]

Shacklette et al.

[11] Patent Number: 4,668,596

[45] Date of Patent: May 26, 1987

[54] NEGATIVE ELECTRODES FOR NON-AQUEOUS SECONDARY BATTERIES COMPOSED ON CONJUGATED POLYMER AND ALKALI METAL ALLOYING OR INSERTING MATERIAL

[75] Inventors: Lawrence W. Shacklette, Maplewood; Taiguang R. Jow, Chatham Township, Morris County; James E. Toth, Maplewood; MacRae Maxfield, North Plainfield, all of N.J.

[73] Assignee: Allied Corporation, Morris Township, Morris County, N.J.

[21] Appl. No.: 875,526

[22] Filed: Jun. 20, 1986

Related U.S. Application Data

[63] Continuation of Ser. No. 725,261, Apr. 19, 1985, abandoned.

[51] Int. Cl.⁴ ........................ H01M 6/16; H01M 10/36
[52] U.S. Cl. ................................... 429/194; 429/197; 429/213
[58] Field of Search .................... 429/213, 194, 212

[56] References Cited

U.S. PATENT DOCUMENTS

| | | | |
|---|---|---|---|
| 4,002,492 | 1/1977 | Rao | 429/194 |
| 4,321,114 | 3/1982 | MacDiarmid et al. | 429/213 |
| 4,442,187 | 4/1984 | MacDiarmid et al. | 429/213 |
| 4,464,447 | 8/1984 | Lazzari et al. | 429/194 |
| 4,472,489 | 9/1984 | Maxfield et al. | 429/213 |
| 4,517,265 | 5/1985 | Belanger et al. | 429/212 |
| 4,522,901 | 6/1985 | Shacklette | 429/212 |

FOREIGN PATENT DOCUMENTS 0070107   1/1983   European Pat. Off. .

OTHER PUBLICATIONS

Rao et al., J. Electrochem. Soc. 124, 1490 (1977).
Besenhard, J. Electroanal. Chem. 94, 77 (1978).
Murphy et al., J. Electrochem. Soc. 126, 349 (1979).
Murphy et al., Mat. Res. Bull. 13, 1395 (1978).

*Primary Examiner*—Donald L. Walton
*Attorney, Agent, or Firm*—Richard C. Stewart; Gerhard H. Fuchs

[57] ABSTRACT

This invention relates to a novel anode for use in batteries, and to batteries containing the anode, which anode comprises a mixture of a conjugated backbone polymer and another electroactive material selected from the group consisting of metals which alloy with alkali metals and alkali metal cation inserting materials as for example transition metal chalcogenides.

39 Claims, No Drawings

NEGATIVE ELECTRODES FOR NON-AQUEOUS SECONDARY BATTERIES COMPOSED ON CONJUGATED POLYMER AND ALKALI METAL ALLOYING OR INSERTING MATERIAL

This application is a continuation of application Ser. No. 725,261 filed Apr. 19, 1985 now abandoned.

BACKGROUND OF THE INVENTION (1) Field of the Invention

This invention relates to polymeric electrodes. More particularly, this invention relates to negative electrodes for non-aqueous secondary batteries composed of conjugated backbone polymers and alkali metal alloying or alkali metal ion inserting materials.

(2) Prior Art

Conjugated backbone polymers, e.g., polyacetylene, polyphenylene, polyacenes, polythiophene, poly(phenylene vinylene), polyazulene, poly(phenylene sulfide), poly(phenylene oxide), polythianthrene, poly(phenylquinoline), polyaniline, polythiophene, and polypyrrole, have been suggested for use in a variety of applications based upon their characteristic of becoming conductive when oxidized or reduced either chemically or electrochemically. The secondary battery application described by, e.g., MacDiarmid et al. in U.S. Pat. No. 4,321,114 (1981); *J. de Physique*, Colloque C3, Vol. 44 (1983), articles beginning on page 579, page 615 and page 537; and K. Kaneto et al., *Japanese J. of Applied Physics*, Vol. 22, pp. L567–L568 (September 1983) and pp. L412–L414 (July 1983), employs one or more electrodes having conjugated backbone polymers as the electroactive material. Such electrodes can, for example, be reversibly complexed with alkali metal or tetraalkylammonium cations during battery cycling, most commonly with insertion of cations into a polymer anode (the negative battery electrode) occurring during charging. The more such cations are inserted, the more conductive the electrode becomes and the more cathodic the potential of the anode becomes.

U.S. Pat. No. 4,002,492 discloses electrochemical cells having an anode consisting essentially of lithium aluminum alloys that contain lithium in amounts between about 63% and 92% and the balance essentially aluminum. Anodes composed of lithium and aluminum are also disclosed in Rao, et al., *J. Electrochem. Soc.* 124, 1490 (1977), and Besenhard, *J. Electroanal. Chem.*, 94, 77 (1978).

European Pat. No. 0070107 A1; Murphy et al., *J. Electrochem. Soc.*, 126, 349 (1979) and Murphy et al., *Mat. Res. Bull.*, 13, 1395 (1978) disclose batteries based on lithium intercalation in layered dichalcogenides.

Composite structures of a conjugated backbone polymer and a non-electroactive material have been described in U.S. Pat. No. 4,294,304 and in the above *J. de Physique* issue, articles beginning on page 137 and on page 151. Representative other components that have been blended with polyacetylene or onto which polyacetylene or polypyrrole have been deposited include polyethylene, polystyrene, graphite, carbon black, NESA glass and silicon. In selected instances, such composite structures have been suggested for use in batteries, see Showa Denko K.K., European Published Patent Application No. 76,119 (1982).

SUMMARY OF THE INVENTION

While batteries have heretofore been constructed in which a conjugated backbone polymer is the electroactive material, such batteries suffer from a number of disadvantages. For example, such cells have heretofore exhibited strongly varying discharge potentials. Moreover, such cells have relatively low volumetric energy densities.

Batteries to be used at room temperature constructed with anodes composed of alkali metal alloys, such as lithium/aluminum alloys, also suffer from a number of disadvantages. For example, such batteries have exhibited relatively low capacity (utilization), low rate capability and poor cycle life.

Generally speaking, the present invention obviates one or more of the disadvantages of the prior art polymer batteries or alloy anode batteries by providing an improved anode for high energy density electrochemical cells which include a cathode containing a cathode active material, an anode containing an anode active material, and a non-aqueous electrolyte having an ionic salt of the anode active material dissolved therein. More particularly, the improved anode of this invention comprises a mixture of a conjugated backbone polymer or copolymer, or a blend of a conjugated polymer with one or more conjugated or non-conjugated backbone polymers and a material selected from the group consisting of metals capable of alloying with an alkali metal and alkali-metal cation inserting materials. The present invention also provides a battery incorporating the novel anode of this invention, which battery comprises:

(a) a cathode;

(b) an electrolyte comprising an organic solvent and an alkali metal-salt; and (c) an anode comprising a mixture of a conjugated backbone polymer or copolymer, or a blend of a conjugated backbone polymer with one or more conjugated or non-conjugated backbone polymers, and a material selected from the group consisting of one or more metals capable of alloying with the alkali metal in said electrolyte and an alkali-metal cation inserting material capable of inserting ions of alkali metal in said electrolyte; said alkali-metal cations being introduced into said anode as a metal alloy or as an inserted ion in said ion inserting material during the charging of said battery.

DESCRIPTION OF THE PREFERRED EMBODIMENTS

As an essential component, the battery of this invention includes an anode which comprises a mixture of one or more conjugated backbone polymers or copolymers, or blends of one or more conjugated polymers or copolymers with one or more conjugated or non-conjugated backbone polymers or copolymers (hereinafter referred to collectively as "conjugated backbone polymer), which polymers, copolymers or blends contain an effective amount of one or more other potential electroactive materials selected from the group consisting of metals which are capable of alloying with alkali metals and materials capable of inserting alkali-metal cations. The structure of this anode can be varied widely. For example, the anode can be in the form of an intimate mixture of compressed powders. Alternatively, the anode can be in the form of a film of the conjugated backbone polymer impregnated with the other component in finely divided form, or in the form of a composite layered structure in which one of the components is a core structure encapsulated by and in intimate contact with the other component. In the preferred embodiments, the anode is in the form of an intimate mixture of compressed powders, or a casting of the polymer having particles of the other electroactive material dispersed therein.

Useful polymers may be any of the variety of conjugated backbone polymers known to those of skill in the art for use as negative electrodes in batteries. Such polymers are preferably conductive in their reduced form and capable of reversibly inserting cations. Useful polymers are also insoluble or substantially insoluble in the electrolyte (ie., preferably a solubility equal to or less than about 500 ppm). Useful conjugated backbone polymers may be conjugated backbone homopolymers or copolymers, or blends of one or more conjugated backbone homopolymers or copolymers with one or more conjugated backbone or non-conjugated backbone homopolymers or copolymers. Useful conjugated backbone polymers can vary widely and include polyacetylene, polyphenylene, (if in the para form), poly(phenylene vinylene) and the like, and blends thereof with other polymers having either conjugated or non-conjugated backbones, such as polyethylene. Other conjugated backbone polymers claimed by others as useful in batteries may also be used in the present invention. Such polymers include polythiophene, polyazulene, poly(phenylquinoline), polyacenes, polyacenediyls, polynaphthalene, and the like and polymeric blends thereof. Amongst these illustrative conjugated backbone polymers, polyacetylene, poly(phenylene vinylene) and poly(p-phenylene) are preferred, and polyacetylene and poly(p-phenylene) are particularly preferred. Most preferred for use in the practice of this invention is polyacetylene.

Useful conjugated backbone polymers are known compounds which can be prepared by conventional means. For example, high quality polyacetylene, a preferred conjugated backbone polymer, can be conveniently prepared by the procedures described in a series of papers by Shirakawa, et al., *Polymer Journal*, Vol. 2, No. 2, pp. 231–244 (1971); *Polymer Journal*, Vol. 4, No. 4, pp. 460–462 (1973); *Journal of Polymer Science Part A-1*, Polymer Chemistry Edition, Vol. 12, pp. 11–20 (1974), and *Journal of Polymer Science Part A-1*, Polymer Chemistry Edition Vol. 13, pp. 1943–1950 (1975), all of which are incorporated herein by reference. Moreover, forms of high quality poly(p-phenylene), another preferred conjugated backbone polymer, can be prepared by the method of Kovacic described in detail in *J. Am. Chem. Soc.* 85, 454–458 (1963), incorporated herein by reference. Furthermore, poly(phenylene vinylene), another preferred conjugated backbone polymer, can be prepared by the procedure described in U.S. Pat. No. 3,404,132 of R. A. Wessling et al.

The second essential component of the anode of this invention is a material selected from the group consisting of metals or alloys which are capable of alloying with alkali metals, and materials which are capable of inserting alkali metal cations. Useful alkali metal alloying metals can vary widely. Illustrative of such useful metals are aluminum, lead, magnesium, tin, bismuth, antimony, silicon, and alloys of these or other metals, such as Al-Si, Al-Mg, Al-Si-Sn, or Wood's Metal (Bi-Pb-Sn-Cd) and the like. The preferred alkali metal alloying metals for use in the practice of this invention are aluminum, lead, tin and alloys thereof. In the particularly preferred embodiments of the invention, aluminum is used for lithium alloying, and lead, tin and tin/lead alloys are used for sodium alloying.

Alkali-metal cation inserting materials can vary widely. As used herein, "alkali metal cation inserting materials" are materials into which alkali metal cations can be inserted, as for example, into channels in the material, between layers of the material and the like. Such materials are known to those of skill in the art. Such materials include but are not limited to graphite, transition-metal chalcogenides, and other conjugated backbone polymers which are capable of being reduced, i.e., donor doped. Preferred cation inserting materials are transition-metal chalcogenides such as $TiS_2$, $MoO_2$, $WO_2$, $VSe_2$, $FeCuS_2$, and $VS_2$.

The amounts of the various components can vary widely, depending on a number of factors, as for example, the balance chosen between electrochemical capacity, and the desired mechanical properties of the anode, electrode, and the like. In general, the amount of the conjugated backbone polymer component in the anode should be sufficient to impart mechanical stability and good cycle life to the electrode. In the preferred embodiments of the invention, the amount of the conjugated backbone polymer component may vary from about 5 to about 75 percent by weight based on the total weight of polymer and other electroactive material in the anode, and in the particularly preferred embodiments up from about 20 to about 50% by weight on the aforementioned basis.

Similarly, the amount of the other electroactive material (e.g., alkali metal alloying material and/or inserting material) can also vary widely depending on a number of factors, as for example, the balance chosen between electrochemical capacity and the desired mechanical properties of the electrode and the like. Usually the amount of such material varies from about 25 to about 95 weight percent based on the total weight of conjugated backbone polymer and other electroactive material. In the preferred embodiments of the invention, the amount of the other material may vary from about 50 to about 80 weight percent on the aforementioned basis.

The anode may include other optional materials known to those of skill in the battery art. These materials are known to those of skill in the art and will not be described herein in great detail. In brief, by way of illustrative examples, the anode may include such other substituents as conductivity aids, inert binders, mechanical supports, and the like. However, in the preferred embodiments, the combination of polymer plus other electroactive material is in the major proportion.

The anode may also be coated with other materials to allow use of the anode with solvents which would otherwise react with the conjugated backbone polymer in the reduced state. For example, the anode can be coated with the reaction product of an oxirane compound as described in U.S. Pat. No. 4,472,487, with the reaction product of an organsulfur compound as described in U.S. Pat. No. 4,472,489 and with the reaction product of certain cyclic compounds as described in U.S. Pat. No. 4,472,488. Each of these patents are incorporated herein by reference.

The particular polymer and alloying metal and/or cation inserting material chosen for use in any particular situation may vary widely. However, in the preferred embodiments of the invention the polymer and other electroactive material are selected such that the range of electroactivity of the polymer encompasses or closely matches that of the other component.

The following table lists exemplary combinations of conjugated backbone polymer and alkali metal alloying metal or alkali metal cation inserting material which can be used in the improved anode of this invention.

| POLYMER | POLYMER ELECTRO-ACTIVE RANGE* | ELECTRO-ACTIVE MATE-RIAL** | ELECTRO-ACTIVE RANGE* |
|---|---|---|---|
| PA, polyacetylene | 0.1–1.8 V | $Li_xAl$ | ~0.2–0.5 |
| PPP, polyphenylene | 0.1–1.1 V | $Li_xMg$ | ~0–0.2 |
|  |  | $Na_xPb$ | 0.3–0.9 |
| PPQ, poly(phenyl-quinoline) | ~1.5 V | $Li_xWO_2$ | 0.3–1.2 V |
|  |  | $Li_xMoO_2$ |  |
| PPV, poly(phenyl-enevinylene) | <1.7 V | $Li_{1+x}TiS_2$ | 0.5–0.6 |
| PAZ, polyazulene | *** | $Li_{1+x}VSe_2$ | 1.0–1.3 |
| PN, polynaphtha-lenediyl | *** | $Li_xFeCuS_2$ | ~1.5 |

*Relative to $Li/Li^+$ reference.
**where $0 < x < 1$.

The table shows that a combination of a polyacetylene and the alloying metal, aluminum (Al), and combinations of poly(phenylene) and the lithium cation inserting material $WO_2$, and poly(phenylquinoline) and the inserting material $MoO_2$ are combinations of polymers and alloying metal or inserting materials which would be expected to provide good results.

The method of fabricating the anode is not critical and can be varied widely. Any method known to those of skill in the art for fabricating composites of polymer and a metal or alkali metal ion inserting material can be used. In the preferred embodiments, the anode is composed of an intimate mixture of compressed powders. The anode is fabricated by (1) derivatizing the surface of a finely divided alkali metal alloying metal or alkali metal cation inserting material with active polymer catalyst; (2) dispersing the derivatized metal or material having a desired small particle size in a suspension or solution of a monomer and/or a pre-polymer of the desired conjugated backbone polymer and polymerizing the monomer and/or pre-polymer in the presence of the dispersed metal or material and; (3) fabricating a cohesive solid by recovering the polymerization product and derivatized metal or material from the polymerization mixture from said suspension or solution and compressing same into a powdered composite, or by casting a film of suspension or gel-like composition comprising the polymerization product, and metal or material.

In a particularly preferred method, a powdered metal, alloy, or other electroactive material, preferably having an average particle diameter equal to or less than about 100 μm and greater than or equal to about 1 μm and possessing an oxide hydroxide layer, is derivatized by reaction with a polymerization catalyst component such as $AlCl_3$, $Ti(O-nBu)_4$, $MoOCl_4$, $MoCl_5$, or $WCl_6$, to form particles of metal, alloy or other material bonded at the surface via its oxide layer to a modified catalyst component. This derivatizing step for metal or alloy can be conveniently represented by the following equation:

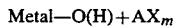

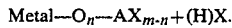

The derivatized metal alloy, or other material powder is then dispersed (e.g., by stirring or ultrasound) in a solution of unmodified polymerization catalyst, and if necessary with a co-catalyst (such as triethylaluminum and tetramethyltin) and monomer for the conjugated backbone polymer such as acetylene, alkyl or aryl substituted acetylenes, (trifluoromethyl)tricyclo-[4-2,20]-deca-3,7,9-triene is introduced. Polymerization reaction conditions including monomer precursors, polymerization catalyst, co-catalyst and the like, are well known in the art. For example, useful conditions are described in detail in H. Shirakawa, et al., Polym. J., 2, 231 (1971); J. C. W. Chien, et al., Macromolecules, 14, 497, (1981), (W. J. Feast et al., European Pat. publication No. 0080 329), Kovacic, J. Am. Chem. Soc. 85:454–458 (1963), and U.S. Pat. No. 3,404,132. The monomer undergoes coordination polymerization to yield a conjugated polymer on a prepolymer. Insoluble polymers form particles and/or gels or films nucleated about the particles of derivatized metal, alloy or other electroactive material. Soluble polymers or prepolymers form suspensions of derivatized metal, alloy or other electroactive material in the polymer solution. Particulate or gel composites may be pressed in a mold or passed between counter rotating rollers to form a cohesive solid; and soluble polymer composite can be cast from the suspension.

The organic solvents which may be included in the electrolyte of the batteries of the present invention may vary widely and can be organic solvents normally used in batteries. Preferably, these solvents should be electrochemically inert to oxidation and reduction during use while simultaneously being capable of dissolving the desired alkali metal salt and providing ionic conductivity equal to or in excess of $10^{-4}$ S/cm. Examples of such useful organic solvents include propylene carbonate, ethylene carbonate, sulfolane, methyl sulfolane, dimethyl sulfolane, 3-methyl-2-oxazolidone, alkane sultones, e.g., propane sultone, butane sultone (the use of sultones as electrolyte compositions is the subject of a related, commonly-assigned U.S. patent application Ser. No. 556,717, now U.S. Pat. No. 4,528,254 and the use of sultones for coatings on polymer anodes is the subject of a related, commonly-assigned U.S. Pat. No. 4,472,489), dimethyl sulfoxide (DMSO), dimethyl sulfite, tetrahydrofuran (THF), 2-methyltetrahydrofuran (2-MTHF), dioxane, dioxolane, 1,2-dimethoxyethane (DME), dimethoxymethane, diglymes, glymes, anisole, nitriles, (e.g., proprionitrile, butyronitrile, acetonitrile, benzonitrile), dichloromethane, tetraethylsulfamide, aromatic hydrocarbons, e.g., toluene, benzene, organo phosphorus compounds, e.g., hexamethylene phosphoramide, and trimethyl phosphate. Mixtures of such available organic solvents may also be used, such as mixtures of sulfolane and acetonitrile, or mixtures of propylene carbonate and dimethoxyethane.

The organic solvents chosen for use in any particular situation will, of course, depend upon many factors such as the precise electrolyte composition used and the voltage range desired, as well as the choice of cathode and other components of the battery used. A particularly important consideration in choosing a solvent is whether the conjugated backbone polymer employed is subject to attack by the solvent. In the preferred embodiments of the invention when uncoated anodes are employed, ether-type solvents such as tetrahydrofuran, dimethoxyethane, diglyme, 2-methyltetrahydrofuran and mixtures thereof are employed because these solvents are generally not reactive with conjugated backbone polymers, when in their neutral or reduced forms. Essentially, any of the above-listed solvents can be used with anodes coated with solvent-resistant coatings; however, preferred for use with coated anodes are propylene carbonate, ethylene carbonate, sulfolane, 3-methylsulfolane and mixtures of any of the above-listed solvents, which mixtures may also include glymes, particularly dimethoxyethane.

Salts for use in the electrolyte of the battery of this invention are of the formula:

MA wherein:

M is an alkali metal; and

A is a species which is anionic in the electrolyte and stable under operational conditions. Preferred alkali metals are lithium, sodium and potassium, and the particularly preferred alkali metals are lithium and sodium. Suitable anionic species include $I^-$, $Br^-$, $Cl^-$, $ClO_4^-$, $PF_6^-$, $AsF_6^-$, $SO_3CF_3^-$, $BF_4^-$, $BCl_4^-$, $AlCl_4^-$, alkylborates, such as $B(CH_3)_4^-$, arylborates, such as $B(C_6H_5)_4^-$, (the use of such borate salts with conjugated polymers being the subject of commonly assigned U.S. patent application Ser. No. 556,721, incorporated herein by reference), $POF_4^-$, $CN^-$, $SCN^-$, $OCN^-$, $CF_3CO_2^-$ (trifluoroacetate), $C_6H_5CO_2^-$ (benzoate), $CH_3C_6H_4SO_3^-$ (tosylate), $SiF_6^=$, $HSO_4^-$ and the like. Preferred anions are alkylborates, arylborates, or alkylarylborates, $PF_6^-$, $ClO_4^-$, halide ions, $SO_3CF_3^-$, and $BF_4^-$, and particularly preferred anions are alkylborates, arylborates, alkylarylborates and $PF_6^-$.

Molten salts may also be employed as the electrolyte of the battery of the invention. The use of conjugated polymers as anodes in room-temperature molten salt batteries is described in the commonly-assigned U.S. Pat. No. 4,463,071, which is incorporated herein by reference. Room-temperature molten salts suitable for use in batteries of this invention include alkali metal halide-trialkylimidazolium chloroaluminate, alkali metal halide-dialkylimadazolium chloroaluminate, and alkali metal halide alkyl pyridinium chloroaluminate. Since in many cases the polymers, alloys, and other ion inserting materials of this invention are stable at elevated temperature, intermediate temperature molten salts (M.P.<200° C.) such as $NaAlCl_4$ or $KAlCl_4$, are also suitable for use.

Cathodes for use in the practice of this invention are not critical and can be varied widely. Suitable cathodes include a material selected from the group consisting of graphite, intercalation compounds of graphite, high surface area carbons (>200 m²/g), transition-metal chalcogenides, and conjugated backbone polymers which are capable of being oxidized (acceptor-doped). Transition-metal chalcogenides and conjugated backbone polymers are preferred cathode materials.

The transition-metal chalcogenides, suitable as cathode materials useful in this invention, can contain inserted alkali metals and include the transition-metal dichalcogenides such as $TiS_2$ and, among others, those listed on page 392 of "Lithium Batteries" edited by J. P. Gabano (Academic Press, 1983) and in K. M. Abraham, Solid State Ionics, vol. 7, pp. 199–212 (1982) (both incorporated herein by reference). These include (with approximate open circuit potentials measured in various organic electrolytes when fully charged or devoid of inserted cations):

| | |
|---|---|
| $Na_xTiS_2$ | 2.1 V versus $Na/Na^+$ |
| $Na_xNbS_2Cl_2$ | 2.2 V versus $Na/Na^+$ |
| $Li_xMoS_2$ | 2.3 V versus $Li/LI^+$ |
| $Li_xFe_{0.25}V_{0.075}S_2$ | 2.4 V versus $Li/Li^+$ |
| $Li_xTiS_2$ | 2.5 V versus $Li/Li^+$ |
| $Li_xMoS_3$ (amorphous) | 2.5 V versus $Li/Li^+$ |
| $Na_xCr_{0.5}S_2$ | |
| $Na_xWO_{3-y}$ | 2.6 V versus $Na/Na^+$ |
| $Na_xMoS_3$ (amorphous) | 2.7 V versus $Na/Na^+$ |
| $Na_xTaS_2$ | 2.7 V versus $Na/Na^+$ |
| $K_xWO_{3-y}$ | |
| $Li_xMoO_3$ | 2.8 V versus $Li/Li^+$ |
| $Li_xV_6O_{13}$ | 2.9 versus $Li/Li^+$ |
| $Li_xCr_{0.5}V_{0.5}S_2$ | 2.9 V versus $Li/Li^+$ |
| $Li_xW_{0.2}V_{2.8}O_7$ | 3.0 V versus $Li/Li^+$ |
| $Li_xCr_3O_8$ | 3.6 V versus $Li/Li^+$ |
| $Na_xCoO_2$ | 3.7 V versus $Na/Na^+$ |
| $Li_xCoO_2$ | 4.7 V versus $Li/Li^+$ |

Suitable polymer cathodes include oxidized polyacetylene, poly(p-phenylene), polyacenes, poly(phenylene vinylene), polyazulene, polynaphthalene, poly(phenylene sulfide), poly(phenylene oxide), polyphenothiazine, polyaniline, polypyrrole, polythiophene, polythianthrene and substituted versions of the above. Such polymers may be coated by reaction, when oxidized, with pyrroles, thiophenes, azulenes, oxiranes, anilines or furans, as described in commonly-assigned U.S. Pat. No. 4,472,987, the disclosure of which is incorporated herein by reference.

The secondary battery of this invention can be charged and discharged in accordance with the procedure described in U.S. Pat. No. 4,321,114. Such procedures are well known to those of skill in the art and will not be described herein in any great detail.

The following specific examples are presented to more particularly illustrate the invention and are not to be construed as limitations therein.

EXAMPLE I

Polyacetylene (PA) powder (prepared from a catalyst of triethyl aluminum and tetrabutoxy titanium which was kept wet in toluene in a refrigerator at −40° C. in an argon-filled dry box before use) was mixed with aluminum (Al) powder (−40+325 mesh) using a mortar and pestle. The mixture was then pressed onto expanded Ni metal in a ½ inch (1.27 cm) diameter stainless steel die under pressures in the range of 5,000 to 75,000 psi (34,470 to 517,050 kPa). The weights of Al and PA were 0.065 g and 0.015 g, respectively. This electrode was dried under vacuum before being assembled into a test cell with a lithium counter electrode, a Celgard ™ separator, and $LiPF_6$ in tetrahydrofuran (THF) electrolyte solution. The OCV of the lithium insertion polymer electrode was 1.895 V vs. Li/Li+ reference. The initial discharge of the cell showed a voltage behavior characteristic of PA down to a potential of 0.3 V vs. Li/Li+. After reaching 0.3 V, the cell voltage remained flat indicating the formation of the $Li_xAl$ alloy. The performance of the cell is summarized in the following Table 1 where the discharge capacity was arbitrarily set at the various values given in the second column.

TABLE 1

| Cycle | Discharge Capacity, mAh (rate: 1 mA/cm²) | Charge Capacity, mAh (rate: 0.5 mA/cm²) | Coulombic Efficiency, % |
|---|---|---|---|
| 1 | 3.42 | 2.52 | 73.6 |
| 2 | 19.80 | 19.69 | 99.5 |
| 3 | 45.85 | 44.60 | 97.3 |

TABLE 1-continued

| Cycle | Discharge Capacity, mAh (rate: 1 mA/cm$^2$) | Charge Capacity, mAh (rate: 0.5 mA/cm$^2$) | Coulombic Efficiency, % |
|---|---|---|---|
| 4 | 11.90 | 10.96 | 92.1 |

EXAMPLE II

PA on an Al electrode was prepared by polymerizing PA by the Shirakawa technique (Polymer Journal, Vol. 2 No. 2, pp 231-244 (1971)) on expanded Al metal (wt. 10 mg, diameter 1.0 cm) with a nickel tab welded on as a lead. The PA on Al electrode was assembled into a cell with lithium in LiBBu$_4$ (Bu=Butyl) in THF solution and discharge at a rate of 0.5 mA/cm$^2$. The capacity obtained when the voltage reached 0.25 V was 9.46 mAh. The capacity of the flat part (0.3 to 0.25 V) of the cell voltage vs. time was 8.54 mAh. Assuming the flat part was completely due to Al, the utilization of Al is 86% (i.e., a final composition of Li$_{0.86}$Al). This electrode was then used as an anode in a cell with a TiS$_2$ cathode (capacity 6.9 mAh) with LiBBu$_4$ in THF as the electrolytic solution. This cell was cycled between 2.3 and 1.4 V at a rate of 0.5 mA/cm$^2$. The cell showed a 3.95 mAh discharge capacity and 3.83 mAh charge capacity (coulombic efficiency=97%).

EXAMPLE III

A mixture of 0.4 g poly(p-phenylene) (PPP) powder (prepared by the method of Kovacic), J. Am. Chem. Soc. 85: 454-458, (1963), 0.36 g LiAl alloy powder (approx. composition: Li$_{0.5}$Al) and 0.14 g Shawinigan Black, was blended together under inert atmosphere. Then 0.03 g of EPDM (ethylene-propylene-diene-terpolymer) in 4 ml of cyclohexane was added and the mixture was stirred for 1 hour. The resulting paste was brushed onto an expanded metal nickel screen and allowed to dry under argon. The resulting electrode having dimension 2 cm×2 cm weighed 212 mg (excluding the weight of the nickel screen). A battery was then assembled employing the above electrode in a glass container as the anode (negative plate) and TiS$_2$ as the cathode (positive plate). The cell also contained a lithium reference electrode, and an electrolyte of 1M lithium tetrabutyl borate in 2-methyltetrahydrofuran. Since the anode contained lithium originally present in the LiAl alloy, the anode initially displayed a voltage of 0.4 V vs Li/Li$^+$, and the cell could be considered partially charged. More lithium was added to the cell by passing 130 coul between the lithium reference and the TiS$_2$ electrode. The cell was then completely discharged during which the original lithium in the aluminum alloy was removed. The charge passed corresponded to an initial alloy composition of Li$_{0.51}$Al. The cell was slowly cycled (approx. one day per half cycle) by charging by a fixed amount followed by complete discharge. The cell voltage varied between about 2.2 V and 1.0 V during which the potential and capacity of the anode was monitored. A large flat portion was observed in the curve of the anode potential vs. capacity curve primarily due to the capacity of the Al component. Assigning the flat portion entirely to aluminum and the varying portion entirely to PPP implies that the composition changes in the anode between 0.2 V and 1.0 V vs. Li/Li$^+$ are equivalent to Li$_{0.66}$Al→Al and $[(C_6H_4)^{-0.25}Li^+_{0.25}]_x$→C$_6$H$_{4x}$. The capacity of the electrode on a weight basis (excluding grid) was 0.24 Ah/g or 12.6 mAh/cm$^2$. The cell was cycled six times over a 2 week period without evidencing any loss of this capacity.

EXAMPLE IV

A. An aluminum-polyacetylene composite film was formed by the polymerization of acetylene gas in a vigorously stirred slurry of surface derivatized aluminum powder in a dilute solution of Ti(O-nBu)$_4$/AlEt$_3$ (1:8) in toluene at −78° C., using a modification of the procedure described in by H. Shirakawa and S. Ikeda, Polym. J., 2, 231 (1971) and J. Hocker (Bayer) U.S. Pat. No. 4,408,207 to produce a suspension of polyacetylene powder. Aluminum spheres ca. 20 μm in diameter were heated to 465° C. in vacuo for 16 hours, stirred in 10% TiCl$_4$ in cyclohexane at 18° C. for 16 hours, washed three times in fresh cyclohexane and vacuum dried to bond a component of an acetylene polymerization catalyst (distilled TiCl$_4$ is a polymerization catalyst; see Kambara, Katano & Hosoe, J. Chem. Soc. Japan, Ind. Chem., 65, 720 (1962)) to the aluminum spheres via their oxide layer forming the derivatized aluminum spheres. A 500 mL 3-necked reactor equipped with a mechanical stirrer was charged with 2 g of derivatized Al powder, 50 mL toluene, 0.34 mL AlEt$_3$, and 0.1 mL Ti(O-nBu)$_4$ under a constant flow of dry nitrogen. The reactor was cooled to −78° C. and vigorous stirring was established before acetylene gas was added to the N$_2$ flow to make a 1:1 mixture of gases. Polymer particles, which were in part nucleated about the derivatized Al powder, were formed immediately. After ca. 10 min., the stirring causes these particles to be aggregated on the reactor wall forming a smooth film. Scanning electron micrographs indicate a uniform distribution of particles through the film thickness as well as intimate contact between Al metal and polymers fibrils.

B. A 1.5-cm$^2$ film weighing 30 mg and having a gross composition of (CHAl$_{1.5}$)$_x$ prepared as in Step A. Step A was electrochemically reduced and reoxidized in an electrolyte of 1M LiBBu$_4$/THF versus a lithium metal counter electrode. During the constant current cycle at 0.33 mA/cm$^2$, the composition of the electrode varied from CHAl$_{1.5}$ to Li$_{0.6}$CHAl$_{1.5}$ and back to Li$_{0.07}$CHAl$_{1.5}$ corresponding to a utilization of about 6 mAh/cm$^2$ or 380 mAh/g. The initial stage of reduction to Li$_{0.12}$CHAl$_{1.5}$ exhibited a sloping voltage vs. charge associated with the n-doping of polyacetylene to 12 mole percent or Li$_{0.12}$CH. The remainder of the reduction process took place at a nearly constant voltage of 0.28 V and is attributed to the alloying of Li with Al to yield a Li distribution of Li$_{0.12}$CH(Li$_{0.32}$Al)$_{1.5}$. The reoxidation proceeded at ca. 0.48 V until the composition was again Li$_{0.12}$CHAl$_{1.5}$ at which point voltage began to increase as lithium was removed from the polyacetylene. A second reduction was allowed to proceed until a lower voltage limit of 0.2 V was reached, at which point, the electrode composition was consistent with 100% Li alloying of the aluminum and 14% doping of the polyacetylene or Li$_{0.14}$CH(Li$_{1.0}$Al)$_{1.5}$, a utilization equivalent to about 675 mAh/g.

EXAMPLE V

A. An aluminum-polyacetylene composite was formed by the polymerization of acetylene gas in a stirred slurry of powdered Li/Al alloy in a dilute solution of Ti(O-nBu)$_4$/AlEt$_3$ (1:4) in toluene at −78° C. Metallurgically prepared Li$_{1.0}$Al alloy was pulverized in a ball mill for 16 hours. A 150 mL reactor was charged with 1 g of the powdered alloy, 50 mL of toluene, 0.17 mL of AlEt$_3$ and finally 0.10 mL of Ti(O-nBu)$_4$ causing the powder to darken. After chilling to $-78°$ C. and degassing the mixture, ca. 0.5 atm. of acetylene was introduced. Since the stirring was slow and insufficient to cause powder formation, a polymer film formed at the top of the catalyst pool and incorporated some of the powdered alloy. After 14 hours, the film was washed in THF and dried. The resulting copper-colored film had a room temperature conductivity of 80 Scm$^{-1}$ and an open circuit voltage vs. Li of 0.76 V consistent with polyacetylene n-doped to ca. 7% with Li$^+$ as the counterion.

B. A 1.0-cm$^2$ film weighing 16.5 mg and having an initial composition of Li$_{0.07}$CHAl$_{0.07}$ prepared as in Step A was electrochemically reduced and reoxidized in an electrolyte of 1M LiBBU$_4$/THF versus a Li metal counter electrode after first stripping away the original Li content. During the first cycle at 0.5 mA/cm$^2$ between voltage limits of 2.5 and 0.2 V, the electrode composition varied from CHAl$_{0.07}$ to Li$_{0.19}$CHAL$_{0.07}$ and back to CHAl$_{0.07}$. The initial stage of reduction to Li$_{0.12}$CHAl$_{0.07}$ exhibited the sloping voltage vs. charge associated with n-doping polyacetylene to 12% or Li$_{0.12}$CH. The remainder of the reduction process took place at a nearly constant voltage of 0.3 V attributed to the alloying of Li with Al to yield a Li distribution of Li$_{0.12}$CH(LiAl)$_{0.07}$. The reoxidation proceeded at 0.45 V until the composition was again Li$_{0.12}$CHAl$_{0.07}$ at which point, the lithium content was exhausted and the polyacetylene began to undope. An additional 29 cycles between 0.2 and 1.5 V exhibited the same voltage characteristics and 100% coulomb efficiency throughout. The utilization ranged from 4.4 mAh/cm$^2$ on the fifth cycle to 4.1 mAh/cm$^2$ on the fifteenth cycle to 3.8 mAh/cm$^2$ on the thirtieth cycle. The amount of Li cycled on the last cycle between the voltage limits of 0.2 and 1.5 V was 83% of that observed on the first cycle within the same voltage range.

EXAMPLE VI

A. An aluminum-polyacetylene composite was prepared by the polymerization of acetylene in a rapidly spinning cylindrical reactor (100 mm I.D.×120 mm) containing 20 g derivatized Al powder (50–1000 um), 35 mL of toluene, 3.5 mL triethyl aluminum, 2.0 mL of titanium tetrabutoxide, and a derivatized cylinder of expanded nickel screen (314 mm×120 mm) fitted closely to the inside wall of the reactor. After chilling to $-79°$ C. and degassing the catalyst mixture, the reactor was rotated about its axis such that the aluminum/catalyst slurry was uniformly distributed on the reactor wall completely immersing the nickel screen. Both the Al powder and the nickel screen had been dried in vacuo at 450° C. and reacted with TiCl$_4$ as in Example IV. A pressure of 500 torr (66.5 kPa) of C$_2$H$_2$ was maintained for 3 hours which allowed the polymer to form throughout the volume of the catalyst-Al slurry, thereby encasing both the Al powder and the nickel screen. After repeated THF washes, two 3.5 cm$^2$ samples each weighing ca. 0.22 g (0.025 g (CH)$_x$, 0.055 g Ni, 0.140 g Al) were reduced by reaction with a 0.1M solution of sodium naphthalide in THF, washed again in THF, and exposed to 400 torr (53.2 kPa) of ethylene oxide for ½ hour to produce poly(ethylene oxide) at the polyacetylene surfaces (U.S. Pat. No. 4,472,487). Following a final THF wash to remove unbonded poly(ethylene oxide), the samples were employed as anodes in the battery cell described in Section B, below.

B. A battery cell having an anode comprised of aluminum powder-polyacetylene (CHAl$_n$)$_x$ composite prepared as in Step A which had been surface modified, lithium cobalt dioxide cathode, and an electrolyte of lithium perchlorate in propylene carbonate was charged and deeply discharged 36 times at 1.4 mA/cm$^2$ of anode (2.8 mA/cm$^2$ based on one side) in the voltage range of 3.0 V to 4.1 V prior to cycling the cell, consisting of two 3.5 cm$^2$ plates of (CHAl$_n$)$_x$ and three plates of LiCoO$_2$ and having a volume of 1.6 cm$^3$, delivered 36 mA at 3.6 V and 120 mA at 2.8 V. The amount of charge released per cycle could be held at ca. 50 mAh but not without gradually increasing the upper voltage limit from 3.9 to 4.1 V. The onset of the 20 mA discharge was at ca. 3.85 V and sloped gradually to 3.5 V before turning down to the cut-off voltage; the average value of the discharge voltage was ca. 3.7 V. The coulomb efficiency remained between 98 and 100% throughout the 36 cycles. The composition of the composite ranged from an initial value of (CHAl$_2$)$_x$ to ca. Li$_{0.14}$CH(Li$_{0.15}$Al)$_2$ when the cell was charged and back to ca. Li$_{0.07}$CHAl$_2$ with each cycle. Raising the upper voltage limit was necessary to access more of the Li stored in the LiCoO$_2$ cathodes because it was not being restored fully from the composite anodes during recharge. This was presumably due to shedding of the large (45–2000 Mm) Al particles occurring during the alloying process and the consequent isolation of some of the Li-loaded fragments.

What is claimed is:

1. A battery comprising:
    (a) an anode comprising as the anode active material one or more conjugated backbone polymers and one or more electroactive materials selected from the group consisting of metals which alloy with alkali metals and alkali metal cation inserting materials;
    (b) an electrolyte comprising an organic solvent and an alkali-metal salt, and
    (c) a cathode;
    said alkali-metal cations from said electrolyte being inserted into said anode as a metal alloy or as an inserted ion in said alkali metal cation inserting material during the charging of said battery.

2. A battery comprising:
    (a) an anode comprising as the anode actual material poly(p-phenylene) and one or more electroactive metals selected from the group consisting of lead, tin and lead-tin alloys;
    (b) an electrolyte comprising NaPF$_6$ and a solvent selected from the group consisting of dimethoxyethane and diglyme; and
    (c) a cathode comprising Na$_x$CoO$_2$;
    said sodium ions in said electrolyte being inserted into said anode as an alloy of said metals during the charging of said battery.

3. A battery comprising:
    (a) an electrolyte comprising an alkali metal salt selected from the group consisting of LiPF$_6$, LiClO$_4$, LiBF$_4$ and LiCF$_3$SO$_3$, and a solvent selected from the group consisting of propylene carbonate, ethylene carbonate, sulfolane and mixtures thereof with dimethoxyethane;
    (b) an anode comprising as the anode active material polyacetylene and aluminum, said anode being coated to inhibit reaction between said polyacetylene in the reduced state and said solvent; and (c) a cathode comprising $Li_xCoO_2$;

said lithium ions in said electrolyte being inserted into said anode as an alloy of aluminum during the charging of said battery.

4. A secondary battery comprising:
(a) an anode which comprises as the anode active material an intimate mixture of one or more conjugated backbone polymers and one or more electroactive materials selected from the group consisting of metals which alloy with alkali metals and alkali metal cation inserting materials;
(b) an electrolyte comprising an organic solvent and an alkali-metal salt; and
(c) a cathode;

alkali-metal cations from said electrolyte being inserted into said anode as a metal alloy or as an inserted ion in said alkali metal cation inserting material during the charging of said battery.

5. The battery of claim 4 wherein said conjugated polymer is reduced (n-doped) during the charging of said battery.

6. The battery of claim 4 wherein said conjugated backbone polymer of said anode is polyacetylene, poly(p-phenylene) or poly(p-phenylene vinylene).

7. The battery of claim 6 wherein said polymer is polyacetylene or poly(p-phenylene).

8. The battery of claim 4 wherein said alkali-metal salt of said electrolyte is a lithium salt, sodium salt or mixture thereof.

9. The battery of claim 4 wherein said material is a metal.

10. The battery of claim 9 wherein said metal is aluminum, lead, tin, antimony, bismuth, magnesium, silicon or alloys thereof.

11. The battery of claim 4 wherein said metal is aluminum, lead, tin or tin-lead alloys.

12. The battery of claim 11 wherein said metal salt is a lithium salt and said metal is aluminum.

13. The battery of claim 11 wherein said metal salt is a sodium salt and said metal is lead, tin or lead-tin alloys.

14. The battery of claim 4 wherein said material is an alkali-metal ion inserting material.

15. The battery of claim 14 wherein said material is a transition metal chalcogenide.

16. The battery of claim 15 wherein said transition metal chalcogenide is selected from the group consisting of $TiS_2$, $MoO_2$, $FeCuS_2$, $VSe_2$ and $VS_2$.

17. The battery of claim 16 wherein said chalcogenide is $TiS_2$ or $WO_2$.

18. The battery of claim 4 wherein said anode comprises:
from about 5 to about 75 percent by weight of said polymer; and
from about 25 to about 95 percent by weight of said other electroactive material, wherein said weight percent is based on the total weight of polymer and material.

19. The battery of claim 18 wherein said anode comprises:
from about 20 to about 50 percent by weight of said polymer; and
from about 50 to about 80 percent by weight of said other electroactive material.

20. The battery of claim 4 wherein said polymer is polyacetylene or poly(p-phenylene), said alkali metal cation is lithium and said other electroactive material is aluminum.

21. The battery of claim 4 wherein said polymer is poly(p-phenylene), said cations are lithium cations and said alkali metal inserting material is $WO_2$.

22. The battery of claim 4 wherein said polymer is polyacetylene or poly(p-phenylene), said alkali metal cations are sodium, and said other electroactive material is lead, tin or a lead-tin alloy.

23. The battery of claim 22 wherein said cathode is $Na_xCoO_2$.

24. The battery of claim 4 wherein said anode is uncoated.

25. The battery of claim 24 wherein said solvent is an ether or a mixture of ethers.

26. The battery of claim 25 wherein said ethers are selected from the group consisting of 3-methyl-2-oxazolidone, tetrahydrofuran, 2-methyltetrahydrofuran, diglyme, and dimethoxyethane.

27. The battery of claim 24 wherein said alkali-metal salt is selected from the group consisting of alkali metal alkylborate salts, arylborate salts, arylalkylborate salts, hexafluorophosphate salts, tetrafluoroborate salts, trifluoromethylsulfonate salts, perchlorate salts and halide salts.

28. The battery of claim 21 wherein said salt is selected from the group consisting of alkali metal alkylborate, arylborate, arylalkylborate and hexafluorophosphate salts.

29. The battery of claim 4 wherein said anode is coated with a material to prevent or retard reaction between the conjugated backbone polymer in the reduced state and said organic solvent.

30. The battery of claim 29 wherein said organic solvent is selected from the group consisting of methyl-2-oxazolidone, propylene carbonate, ethylene carbonate, sulfolane, 3-methylsulfolane, and mixtures of one or more of the foregoing solvents and one or more glymes.

31. The battery of claim 30 wherein said glyme is dimethoxyethane.

32. The battery of claim 31 wherein said salt is an alkali metal hexafluorophosphate, perchlorate, trifluoromethylsulfonate, tetrafluoroborate or tetrachloroaluminate.

33. The battery of claim 4 wherein said cathode is composed of a conjugated backbone polymer or a transition-metal chalcogenide.

34. The battery of claim 33 wherein said cathode is composed of a transition-metal chalcogenide.

35. The battery of claim 34 wherein said chalcogenide is $TiS_2$, $Li_xCoO_2$ or $Na_xCoO_2$.

36. The battery of claim 4 wherein said anode comprises an intimate mixture of said polymer and said material in which the polymer forms a continuous phase with particles of said materials dispersed therein.

37. A secondary batter according to claim 4 wherein said anode active material further comprises one or more inert binders intimately mixed with said polymers and said materials.

38. A secondary battery according to claim 4 wherein said anode active material comprises an intimate mixture of compressed powdered polymers and materials.

39. A secondary battery according to claim 38 wherein said anode active material further comprises compressed powdered one or more binders.

* * * * *

UNITED STATES PATENT AND TRADEMARK OFFICE
CERTIFICATE OF CORRECTION

PATENT NO. : 4,668,596

DATED : May 26, 1987

INVENTOR(S) : Lawrence W. Shacklette, Taiguang R. Jow, James E. Toth, and MacRae Maxfield It is certified that error appears in the above-identified patent and that said Letters Patent is hereby corrected as shown below:

Cover page & Col. 1: Title reads: "NEGATIVE ELECTRODES FOR NON-AQUEOUS SECONDARY BATTERIES COMPOSED ON CONJUGATED POLYMER AND ALKALI METAL ALLOYING OR INSERTING MATERIAL" should read -- NEGATIVE ELECTRODES FOR NON-AQUEOUS SECONDARY BATTERIES COMPOSED OF CONJUGATED POLYMER AND ALKALI METAL ALLOYING OR INSERTING MATERIAL --.

Col. 13, line 49 (Claim 16): "$TiS_2$, $MoO_2$, $FeCuS_2$, $VSe_2$ and $VS_2$" should read -- $TiS_2$, $MoO_2$, $WO_2$, $FeCuS_2$, $VSe_2$ and $VS_2$ --.

Signed and Sealed this

Twentieth Day of October, 1987

Attest:

DONALD J. QUIGG

Attesting Officer

Commissioner of Patents and Trademarks